United States Patent
Wilson, Jr.

(10) Patent No.: US 6,757,280 B1
(45) Date of Patent: *Jun. 29, 2004

(54) ASSIGNING UNIQUE SNMP IDENTIFIERS

(75) Inventor: Richard Alexander Wilson, Jr., Cota De Caza, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,115

(22) Filed: Oct. 2, 1998

(51) Int. Cl.$^7$ ................................. H04L 12/28
(52) U.S. Cl. .............. 370/389; 370/395.3; 709/223
(58) Field of Search .................. 370/389, 392, 370/395.3, 469; 709/223, 245; 340/825.35, 825.44; 707/1, 10, 100, 104

(56) References Cited

U.S. PATENT DOCUMENTS

| | | | |
|---|---|---|---|
| 5,367,635 A | * 11/1994 | Bauer et al. | 709/223 |
| 5,572,195 A | * 11/1996 | Heller et al. | 340/825.35 |
| 5,651,006 A | * 7/1997 | Jujino et al. | 370/389 |
| 5,778,183 A | * 7/1998 | Filion et al. | 709/223 |
| 5,920,869 A | * 7/1999 | Wakayama et al. | 707/103 R |

OTHER PUBLICATIONS

Case et al, RFC 1157, SNMP, IETF, pp. 1–38, May 1990.*
Scholtes et al, Implementation of a Network Management Service, Thesis, University of Twente, pp. 1–60, 1994.*
Katevenis et al, ATLAS I: a single–chip, gigabit ATM switch with HIC/HS links and multi–lane back–pressure, Microprocessors and Microsystems, vol.: 21, Issue: 7–9, pp. 881–490, Mar. 30, 1998.*

* cited by examiner

*Primary Examiner*—Frank Duong
(74) *Attorney, Agent, or Firm*—Fitzpatrick, Cella, Harper & Scinto

(57) ABSTRACT

Managing an SNMP device over a network by transmitting SNMP messages to the managed device while ensuring that an SNMP packet identifier for each message is unique. The SNMP packet identifier is selected in correspondence to the physical memory address at which the SNMP message is stored, and may be the first or last such memory address, or any memory address in between. Because the packet identifier corresponds to the physical memory address of the message, each packet identifier is guaranteed to be unique since subsequent messages cannot occupy the same physical memory address as a prior message unless the prior message is already safely gone.

16 Claims, 6 Drawing Sheets

ASSIGNING UNIQUE SNMP IDENTIFIERS

BACKGROUND OF THE INVENTION

1. Field of the Invention

The present invention pertains to assigning a unique packet identifier to SNMP (simplified network management protocol) network management messages, so that each SNMP message transmitted by a managing client over a local or wide area network has a unique packet identifier.

2. Description of the Related Art

SNMP (simplified network management protocol) has become an industry-accepted standard for managing devices on a local or wide area network. According to this protocol, SNMP management messages are transmitted over the network from a managing client to a managed device. The managed device responds with a suitable network message such as an acknowledgement message. Depending on the response from the managed device, or the absence thereof, the managing client can determine what additional management steps must be taken.

In order to determine which SNMP message a managed device is responding to, and otherwise to identify the SNMP message, the managing client assigns a packet ID to each SNMP message. Optimally, the packet ID is a unique number so that the managing client can distinguish one SNMP message from another. Heretofore, however, the process of assigning a unique SNMP packet identifier has been difficult.

For example, according to one conventional technique for assigning packet identifiers, the managing client simply increments a counter when a new SNMP message is being prepared, and uses the incremented counter as the packet identifier. Such a technique creates difficulties, however, when the counter rolls over, since packet identifiers might be duplicated. In such instances, there might still be valid SNMP packets outstanding, which will now be indistinguishable from newly-issued SNMP packets because of the duplicated packet ID.

SUMMARY OF THE INVENTION

The present invention addresses the foregoing difficulties by assigning packet IDs that are guaranteed to be unique. Specifically, although the invention might assign a packet ID that has previously been used, the packet ID is only re-used if the original SNMP management client is "safely gone".

The invention is premised on the inventor's recognition that each SNMP message for any one managing client is stored at a physical memory address (which might correspond to real memory or to virtual memory, depending on disk swapping techniques in place) with the physical memory address being unique for each SNMP message for any one managing client. Therefore, if the physical memory address for a second SNMP management message matches that of a first SNMP management message, and is thus being re-used, the first SNMP message must be safely gone.

Thus, in one aspect, the invention assigns SNMP packet identifiers for an SNMP message in correspondence to the physical memory address at which the SNMP message is stored. Preferably, the packet ID corresponds to the starting address for the SNMP message, but other addresses such as the second or the last address of the SNMP message can also be used, so long as the precise address being used is applied with consistency. The SNMP message is then packaged into a network message by including the SNMP packet identifier, the port address of the managing client, and the destination address of the managed device. The network message is then transmitted.

Thereafter, upon receipt of a response from the managed device, the SNMP packet identifier is guaranteed to be unique for each SNMP management client. Specifically, while it is possible for different SNMP management clients to issue SNMP messages having the same packet identifier, each such SNMP management client will have a different port address, thereby guaranteeing that the response will be received by the proper client. At the same time, since it is the client who knows which SNMP messages are still outstanding, the client need only ensure that each SNMP message that is still outstanding remain in memory until it has been properly responded to, or is otherwise no longer needed. Once a response has been received, or the message is otherwise no longer needed, the SNMP management client can delete a message from memory and re-use the same physical memory address. Re-use of the same memory address will not cause collision with prior packet identifiers, since the prior messages are guaranteed to be safely gone.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
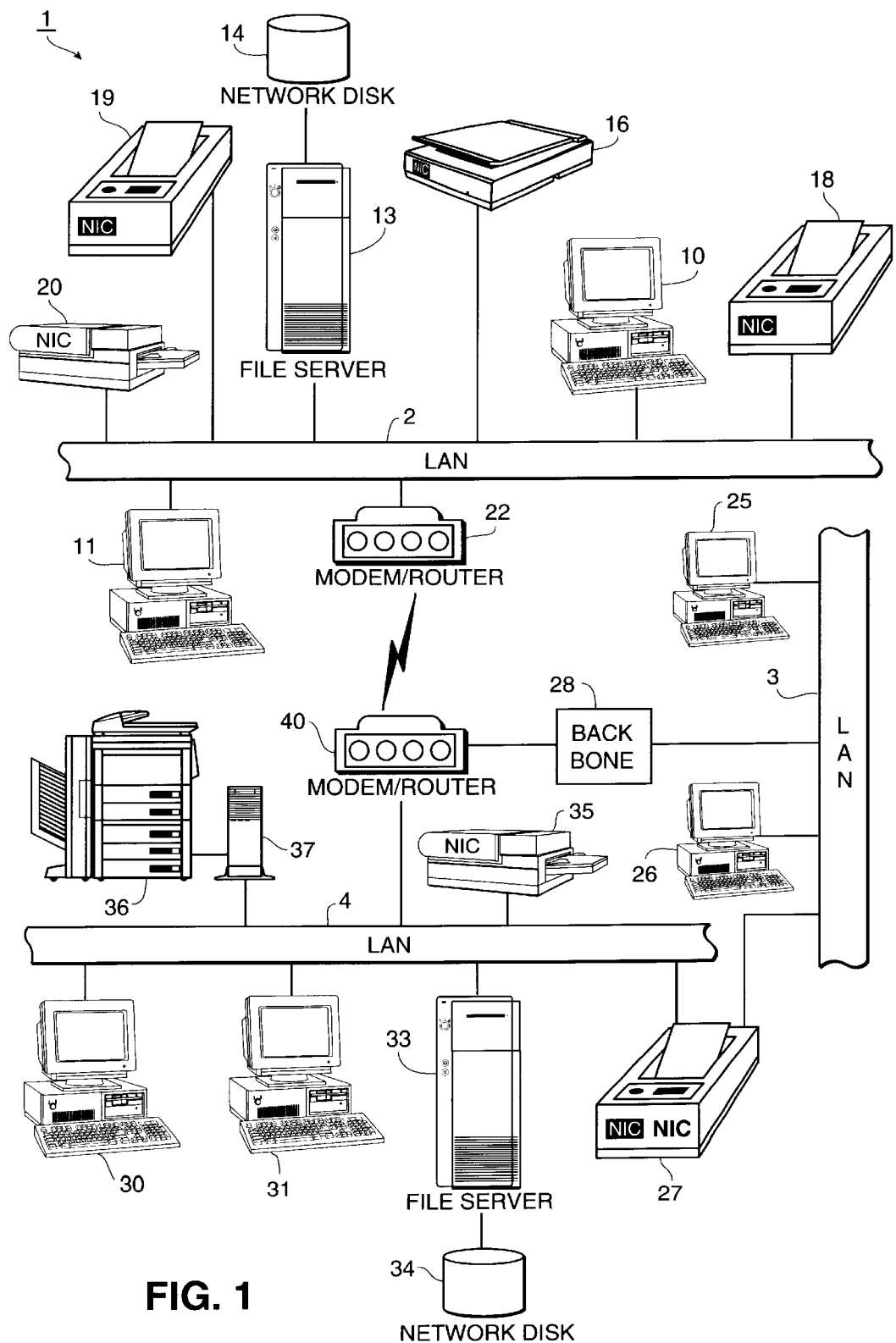
FIG. 1 is a view of a network in which the present invention can be utilized.

FIG. 1 is a view of a network in which the present invention can be utilized. Networks 1 includes local area network (LAN) 2, LAN 3, and LAN 4, which are interconnected into a wide area network (WAN).

Workstations 10 and 11 are connected to LAN 2. Workstations 10 and 11 run an operating system such as Microsoft Windows 95, Microsoft Windows NT® or UNIX, and each includes network modules to support networking. The network modules allow each of workstations 10 and 11 to utilize the resources connected to the WAN. These workstations are described in more detail below with reference to FIGS. 2 and 3.

Also connected to LAN 2 are file server 13 and network disk 14, which provides shared storage to devices connected to LAN 2. File server 13 runs a network operating system, such as Novell®, Microsoft Windows NT® or UNIX, in order to provide file services to the WAN.

Scanner 16 provides scanner services, and printers 18, 19 and 20 provide printer services. Each of network printers 18, 19 and 20, and scanner 16, includes a network interface card (NIC). These NICs allow network deices to be connected directly to LAN 2, without the need for a dedicated workstation or computer to serve as a printer server. The NICs preferably gather information about printer/scanner usage, status, jobs and the like. In addition, the NICs can provide job buffering, spooling and management functionality to the associated network devices.

LAN 2 further includes modem/router 22, which allows connection to other networks. The network operating system and network modules on file server 13 and workstations 10 and 11 allow those devices to utilize resources on the other LANs. Likewise, other networks preferably can utilize some or all of the devices on LAN 2.

Workstations 25 and 26 are connected to LAN 3. Printer 27 also is connected to LAN 3 through one of two NICs in printer 27. Printer 27 provides printer services to devices on the WAN.

Backbone 28 connects LAN 3 to other networks. This connection allows the devices on LAN 3 to utilize resources on other LANs, as well as making some or all of the devices on LAN 3 available for use by the other LANs. Preferably, backbone 28 is a high-speed dedicated line such as a T1 line along with the associated hardware necessary for the connection.

Workstations 30 and 31 are connected to LAN 4, along with file server 33 and network drive 34. File server 33 can run the same operating system as file server 13 of LAN 1, or file server 33 can use an entirely different operating system.

Printer 27 is connected to LAN 4 through the second one of the two NICs in that printer. Printer 35 also is connected to LAN 4 through a NIC. Printer/copier 36 is connected to LAN 4 through printer server 37. Printers 27 and 35 provide printer services to devices on the WAN, and printer/copier 36 provides printer, copier and preferably scanner services to the WAN. Printer server 37 and the NICs in printers 27 and 25 all preferably gather information about printer usage, printer status, print jobs and the like. In addition, the printer server and the NICs can provide print job buffering, spooling and management functionality for the associated printers.

Modem/router 40 provides LAN 4 with a connection to other LANs. This connection allows the devices on LAN 4 to utilize the other networks. In addition, the connection preferably allows those other networks to use some or all of the devices on LAN 4.

Thus, all three LANs are interconnected, enabling a device on one of the LANs to access devices on the other two LANs. For example, workstation 10 on LAN 1 preferably can share files with workstation 25 on LAN 3, store or read data from network disk 34 on LAN 4, and print to printer 35 on LAN 4.

For security reasons, access to certain devices on each of the LANs can be limited. For example, access to certain portions of data stored on network disk 14 could be limited to workstations 10 and 11, or even to just file server 13.

Other devices can be connected to each of the LANs, as indicated by the curved break lines shown at the ends of the LANs. Examples of such devices are fax machines, telephone controllers, digital cameras, and automated production and control devices used in manufacturing. These devices can be connected to network 1 along with other workstations (including so-called thin and thick clients), servers, printers, scanners, modems, and the like in innumerable ways. In addition, the network can be connected to other networks, including the World Wide Web, thereby creating a vast network of a multitude of devices. So-called virtual networks can also be created by forming a network from a sub-set of the devices connected to the Web. The invention is equally applicable to these different networks, as well as to networks that have different architectures and that are connected in different ways, such as wireless networks.

In order to manage the devices on network 1, a managing client program is run on one of the workstations. Devices such as printers, scanners, copiers, modems, and the like can be managed by the managing client. For example, printer configuration (e.g., duplex, resolution, media type, etc.) can be managed by the client. In addition, if a device is connected to network 1 through a NIC, the managing client also can manage the NIC. For example, the managing client can access usage statistics or manage the queue in the NIC.

The managing client sends management messages across the network to network devices so as to check on device status, request usage statistics, view and update device configuration and the like. These management messages are different than job messages such as messages that tell a printer to print a page or tell a scanner to scan an image. In particular, management messages request or change data in a device that is related to how that device operates, as opposed to instructing the device to perform. Examples of this management data include, but are not limited to, status data (e.g., idle, busy, online or offline), usage data (e.g., amount of data processed) and configuration data (e.g., duplex, resolution, queue size or color mode).

The messages sent by the client include identifiers that are used by the network devices when sending their responses to the messages. Thus, when a network device responds to a message from a managing client, the network device includes these identifiers in the response so that the network client can match the response to the appropriate one of the management messages sent by the client.

Figure 2:
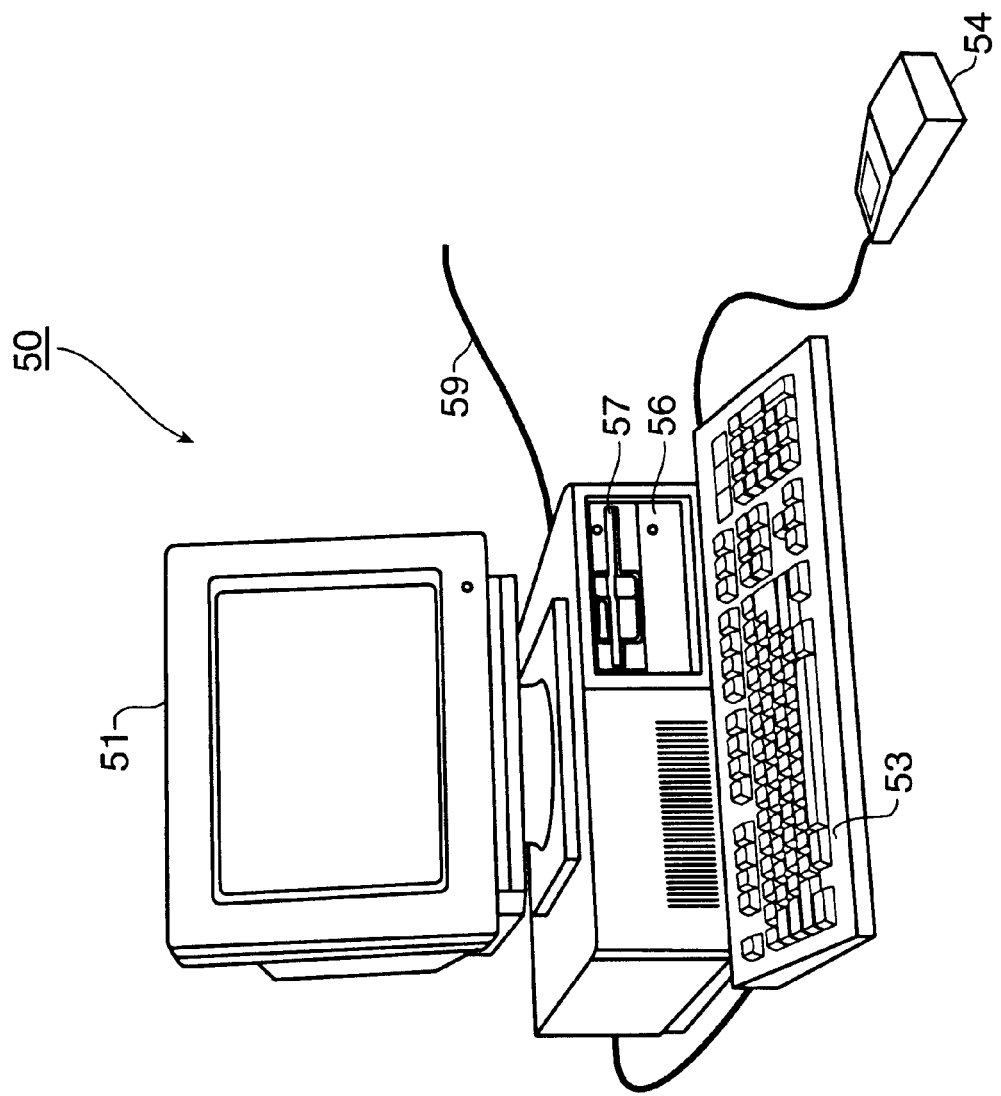
FIG. 2 is a representational view of a workstation that can be used to manage network devices on the network illustrated in FIG. 1.

FIG. 2 is a representational view of a workstation that can be used to manage network devices on the network illustrated in FIG. 1. Workstation 50 may be any one of the workstations shown in FIG. 1, or may be another workstation connected to network 1 through a modem, LAN, WAN, backbone, or any other network connection. Workstation 50 may be a Macintosh, PC-compatible, or other type of system having an operating system such as a windowing operating system, like Microsoft Windows NT®, or a non-windowing operating system such as DOS or UNIX. In the preferred embodiment, workstation 50 is a Pentium®-based computer system.

Provided with workstation 50 are display 51 which may be a color monitor, keyboard 53 for entering user commands, an pointing device 54 such as a mouse for pointing to and manipulating graphical user interfaces and other objects displayed on display 51.

Workstation 50 preferably also includes a computer readable storage medium, such as a mass storage device like fixed disk 56 for storing computer-executable process steps for the operating system, including network modules, network management clients, other applications, data, and network utilities. Such storage also may be provided by a CD-ROM (not shown) or a network drive connected to network 1.

Network interface 59 provides an interface to network 1, for example through a modem, LAN, WAN, backbone, or any other network connection. Network interface 59 can comprise any type of connection that supports network communications, along with the associated hardware such as a communication card. Examples of such connections include a 10baseT cable, a thin or thick Ethernet cable, a wireless network connection, or a cellular telephone connection. Workstation 50 manages devices on network 1 through network interface 59.

Although a programmable general-purpose computer is shown in FIG. 2, workstation 50 for managing network devices can be a dedicated computer terminal or any other type of data processing equipment that can access network 1.

Figure 3:
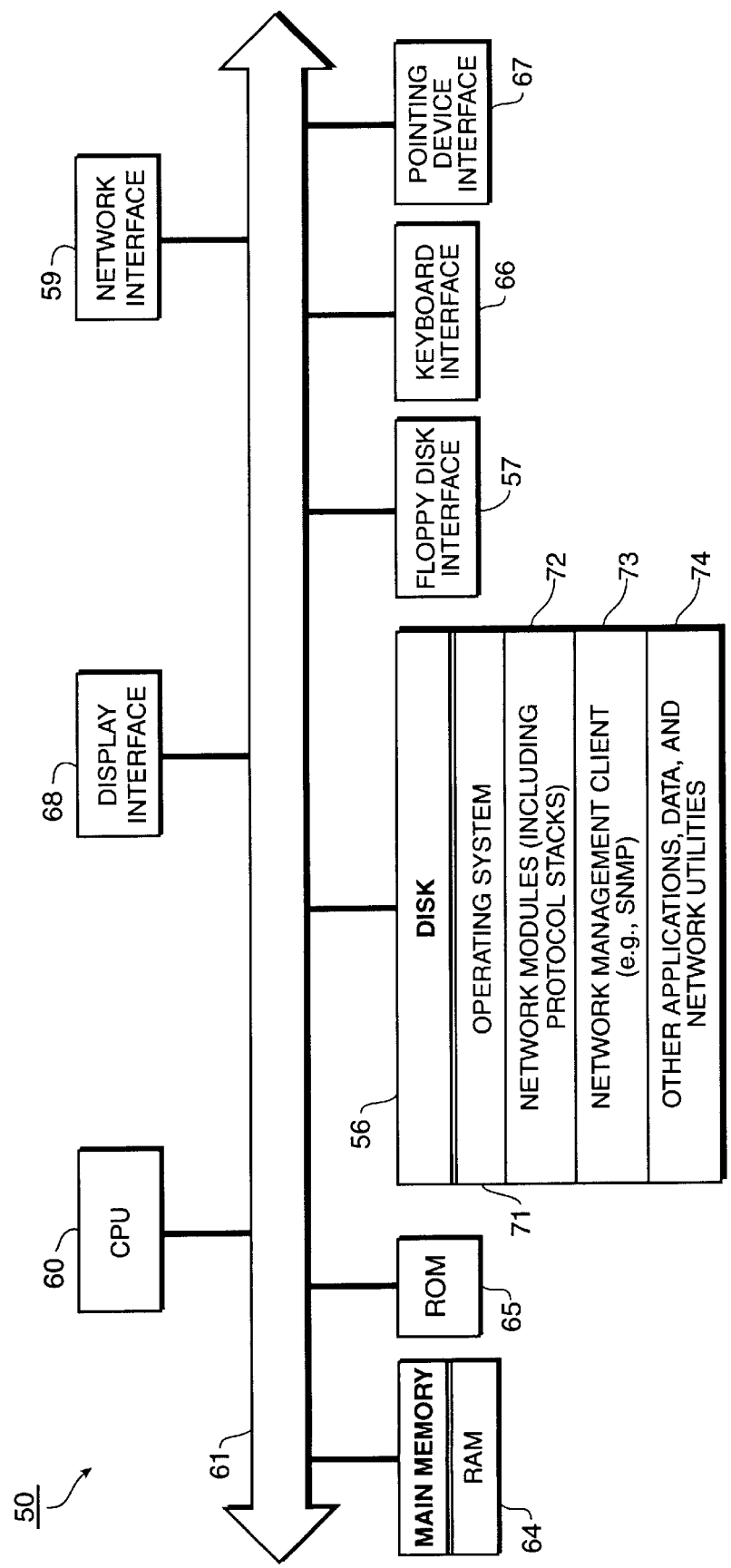
FIG. 3 is a block diagram showing the internal architecture of the workstation illustrated in FIG. 2.

FIG. 3 is a block diagram showing the internal architecture of workstation 50. As shown in FIG. 3, workstation 50 includes central processing unit (CPU) 60, which interfaces with bus 61. Also interfacing with bus 61 are fixed disk 56, floppy disk interface 57, network interface 59, main memory (RAM) 64, read only memory (ROM) 65, keyboard interface 66 to keyboard 53, pointing device interface 67 to pointing device 54, and display interface 68 to display 51.

Main memory 64 interfaces with bus 61 so as to provide RAM storage to CPU 60 during execution of software applications. More specifically, CPU 60 loads process steps from a computer readable medium such as fixed disk 56 or some other source such as a network disk into main memory 64. CPU 60 then executes the stored process steps from main memory 64 in order to execute application programs such as a network management client according to the invention. Data, including network device status, statistics, and configuration, can be stored in main memory 64, or some other writable memory medium. Data can also be stored on a mass storage device such as fixed disk 56 or a network disk, and that data can be accessed by applications through well-known disk swapping techniques.

As also shown in FIG. 3, fixed disk 56 typically stores operating system 71, network modules 72, and application programs including network management client 73, which preferably operates in accordance with simple network management protocol (SNMP). Other applications, data, and network utilities also can be stored on fixed disk 56.

Network management client 73 is executed by workstation 50 in order to manage devices on network 1. In order to manage the devices, network management client 73 communicates with those devices using a network management protocol such as SNMP.

Figure 4:
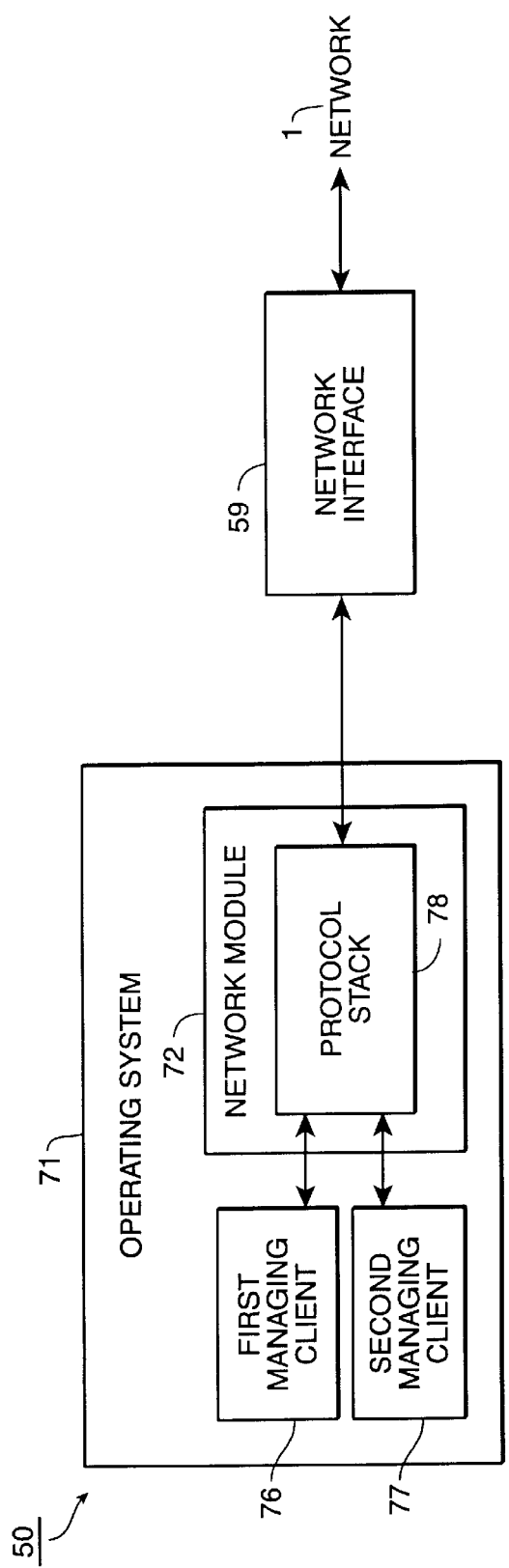
FIG. 4 is a block diagram for explaining communication using SNMP between network management clients and a network.

FIG. 4 is a block diagram for explaining communication using SNMP between network management clients running on workstation 50 and network 1. As shown in FIG. 4, two network management clients, namely first managing client 76 and second managing client 77, are running under operating system 71. Also running under operating system 71 is network module 72, which includes protocol stack 78.

In operation, managing clients 76 and 77 generate SNMP messages, which are then passed to network module 72. Network module 72 places the messages on protocol stack 78, which is preferably an IPX, IP, or NetBios stack. The network module processes messages on the stack, prepending an appropriate header to each message and otherwise formatting the message according to the stack protocol so as to form a packet. The header for each message includes an source port (or socket) address corresponding to the application program that generated the message and a destination port (or socket) address for a destination program or device.

After a message is packaged into a packet, it is transmitted over network 1 through network interface 59.

For example, first managing client 76 could generate a message for printer 35 requesting configuration information. This message would go on protocol stack 78, and a header would be prepended to the message in order to form a packet. The header would include a source port address corresponding to first managing client 76 and a destination port address corresponding to printer 35. Then, the packet would be transmitted through network interface; 69 to network 1. Printer 35 would receive the packet-through the network.

Packets also can be received by workstation 50 from programs and devices running on network 1. In particular, packets transmitted over network 1 by a program or device pass through network interface 59 and are placed on protocol stack 78. Network module 72 examines the header for each packet, and determines from the destination port (or socket) address in the header whether that packet is intended for a program running on workstation 50. If the packet is intended for a program on workstation 50, network module 72 sends the packet to that program.

Continuing the previous example, a return packet from a printer 35 sent in response to the configuration request would specify the port address for first managing client 76 as its destination port address. This packet would be placed on protocol stack 78, where the match between the packet's destination port address and the port address for first managing client 76 would be identified. As a result, network module 72 would send the message in the packet to first managing client 76.

Variations exist on the foregoing communication between workstation 50 and programs and devices on network 1. For example, under different protocols, the header could be appended to the message as opposed to prepended, or separate protocol stacks could be used for incoming and outgoing packets. However, in all of these protocols, a mechanism exists for ensuring that packets reach the correct program or device.

Figure 5:
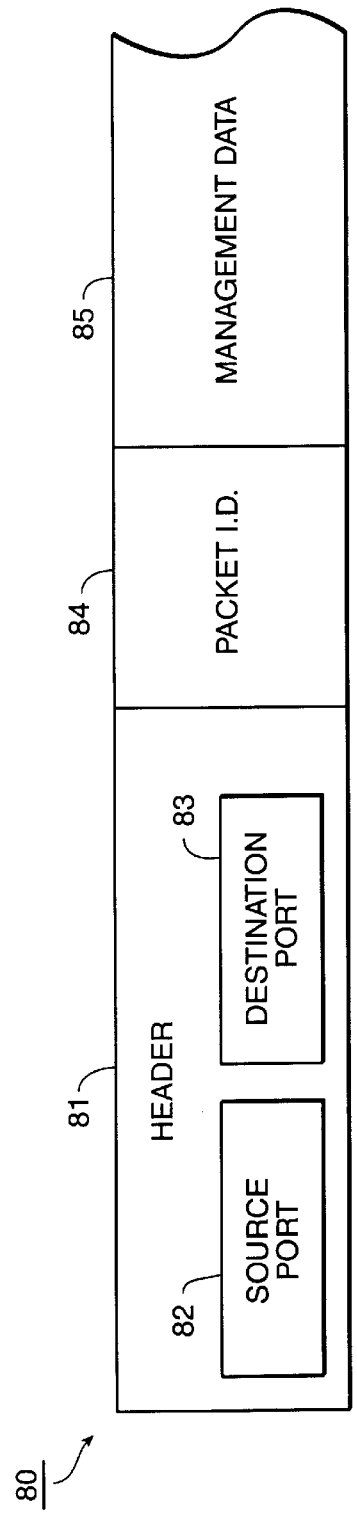
FIG. 5 is a block diagram for explaining the structure of an SNMP packet.

FIG. 5 is a block diagram for explaining the structure of an SNMP packet. SNMP packet 80 has the same format as the packets discussed above with reference to FIG. 4. In particular, SNMP packet 80 includes header 81, which in turn contains destination port address 82 and a source port address 83. In addition, SNMP packet 80 includes packet identification (PID) 84, which is generated by the managing client. SNMP packet 80 also includes the body of an SNMP message in management data 85, which requests or changes data in a device that is related to how that device operates (e.g., requests or changes status, usage or configuration data).

Optimally, PID 84 is a unique number so that a managing client can distinguish one SNMP message from another. Heretofore, however, the process of assigning a unique SNMP packet identifier has been difficult. For example, according to one conventional technique, the managing client simply increments a counter when a new SNMP message is prepared and uses the incremented count as PID 84. Such a technique creates difficulties, however.

First, when the counter rolls over, there might still be valid SNMP packets outstanding, which will now be indistinguishable from newly-issued SNMP packets because of the duplicated PID. The newly-issued packets can have different and possibly incompatible contents as compared to the valid packets. As a result, collisions between these packets can result in errors in network management.

Second, if an SNMP packet is lost or if the counter is erroneously incremented (or not incremented), for example as a result of preemption of system resources by another application, then the count can become out of synch with the SNMP packets. As a result, packets will not be properly identified, leading to unpredictable management operations or even complete failure of the managing client.

The present invention addresses the foregoing difficulties by assigning packet IDs that are guaranteed to be unique for all outstanding packets. Specifically, although the invention might assign a packet ID that has previously been used, the packet ID is only re-used if the original SNMP management client is "safely gone".

Figure 6:
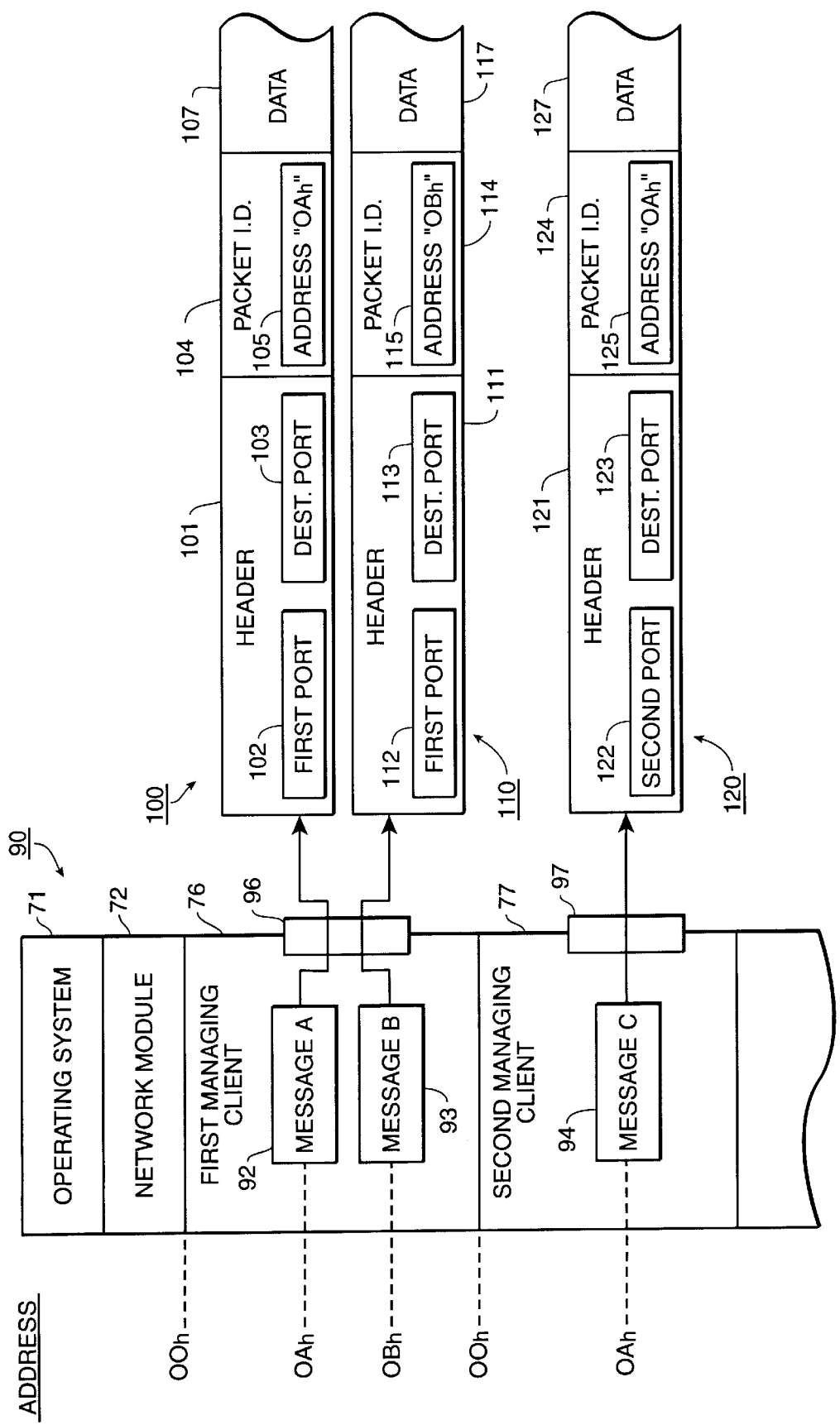
FIG. 6 is a block diagram for explaining generation of header and packet identification information for SNMP packets according to the invention.

FIG. 6 is a block diagram for explaining generation of header and packet identification information for SNMP packets according to the invention. Briefly, an SNMP packet identifier is assigned to an SNMP network message issued by an SNMP managing client to a managed device. The SNMP network message is stored in memory, and the SNMP packet identifier is assigned a number corresponding to the physical memory address of the SNMP message. Because the SNMP message resides at this address until it has been fully processed, this identifier is guaranteed to be unique until the SNMP message is "safely gone".

In more detail, memory map 90 in FIG. 6 is a representation of the organization of main memory 64 of workstation 50. Main memory 64 includes operating system 71, network module 72, and at least one managing client for managing network devices. In the case illustrated in FIG. 6, first managing client 76 and second managing client 77 are such managing clients. As mentioned earlier, all or portions of these programs also can be stored on a mass storage device such as fixed disk 56 through use of conventional disk swapping techniques.

Physical memory is assigned to each program running on workstation 50, with the operating system coordinating real memory usage so that each different application has its own (virtual) memory space which generally starts at 00h. For example, under Windows 95®, each different application has its own 4-gigabyte addressable memory space. Preferably, a virtual memory mapping is used so as to allow for disk swapping. This arrangement is illustrated on the left side of FIG. 6 by the "00h" address indicated for the starts of both first managing client 76 and second managing client 77. Alternatively, a real memory mapping is used, with every byte in all of memory map 90 having its own unique memory address assigned thereto.

In either case, each byte within any program, such as first managing client 76, has a unique memory address. In the case of a real memory mapping, these memory addresses are not repeated even from program to program. However, in the case of a virtual memory mapping, memory addresses are not unique from program to program. For example, as shown in FIG. 6, the memory mapping for first managing client 76 and the memory mapping for second managing client 77 both include memory address "0Ah".

In FIG. 6, first managing client 76 has generated two SNMP messages that need to be sent to a network device. Message A 92 is stored at address "0Ah", and message B 93 is stored at address "0Bh". According to the invention, a message can be said to be stored at an address if any part of the message is stored at that address. For convenience, the address of the first byte or the last byte preferably is used as the address of the message, although the address for any other byte of the message will work.

As shown in FIG. 6, second managing client 77 has generated message C 94. In second managing client 77, message C 94 is stored at address "0Ah". For illustrative purposes, this memory address is the same as the memory address of message A 92 in first managing client 76. Such a coincidence in memory addresses between managing clients can occur, for example, when two instances of the same managing client are running on workstation 50.

In order to send a message, first managing client 76 uses network module 72, as discussed above with respect to FIG. 4. The network module assigns a port (or socket) to first managing client 76, and the port address for this port is used in the header added to the message according to the protocol used by network module 72. Conceptually, the port can be thought of as being attached to first managing client 76, such as first port 96 shown in FIG. 6. Messages sent by the client can be thought of as passing through the port. Thus, message A 92 and message B 93 are shown as passing though first port 96 from first managing client 76. Likewise, message C 94 is sent by second managing client 77 using second port 97.

When message A 92 is sent by first managing client 76, the message is packaged into packet 100. Header 101 of packet 100 is added to the message by network module 72. Header 101 includes source port address 102 corresponding to first port 96 and destination port address 103 corresponding to a port for an intended recipient of the packet. Packet 100 also includes packet identification (PID) 104, which is generated by first managing client 76. According to the invention, PID 104 includes at least number 105 corresponding to the address of message A 92 in first managing client 76, in this case address "0Ah".

In a like manner, message B 93 is packaged into packet 110. Header 111 of packet 110 is added to the message by network module 72. Header 111 includes source port address 112 corresponding to first port 96 and destination port address 113. Packet 110 also includes PID 114, which is generated by first managing client 76. According to the invention, PID 114 includes at least number 115 corresponding to the address of message B 93 in first managing client 76, in this case address "0Bh".

Message C 94 is packaged into packet 120. Header 121 of packet 120 is added to the message by network module 72 and includes source port address 122 corresponding to second port 97 and destination port address 123. Packet 120 also includes PID 124, which is generated by second managing client 77. According to the invention, PID 124 includes at least number 125 corresponding to the address of message C 94 in second managing client 77, in this case address "0Ah".

By virtue of the foregoing operation, the combination of port address and PIDs forms a unique SNMP identifier for each of packets 100, 110 and 120. In particular, even though packets 100 and 110 have the same source port address stored in their respective headers, the PID for each packet is different due to the different memory addresses for message A 92 and message B 93. In addition, even though packets 100 and 120 have the same memory address numbers in their respective PIDs, the headers for the two packets are different due to the different source port addresses assigned to first managing client 76 and second managing client 77.

These unique identifiers are used by network devices when they respond to messages from a managing client. In particular, the packet for a response has a header that identifies the port address of the managing client to which the device is responding, and the port address of the responding device. The packet also has a PID that includes the number for the memory address of the message sent by that managing client. Thus, the managing client can match a response from a device to an outstanding message that the client had previously sent.

In addition, so long as the managing client keeps a message in memory until the client takes appropriate action to the message, based for example on a corresponding response from a network device or until the message times out, the PID for that message is guaranteed not to be used for another message until a management process corresponding to the outstanding message has been completed. Thus, PIDs for outstanding messages from a particular client are guaranteed to be unique. Once the client has taken appropriate action, the message can be erased from memory. At this point, since the message is "safely gone", a new message with a PID identifying the same memory address can be generated without risking collisions and errors.

Figure 7:
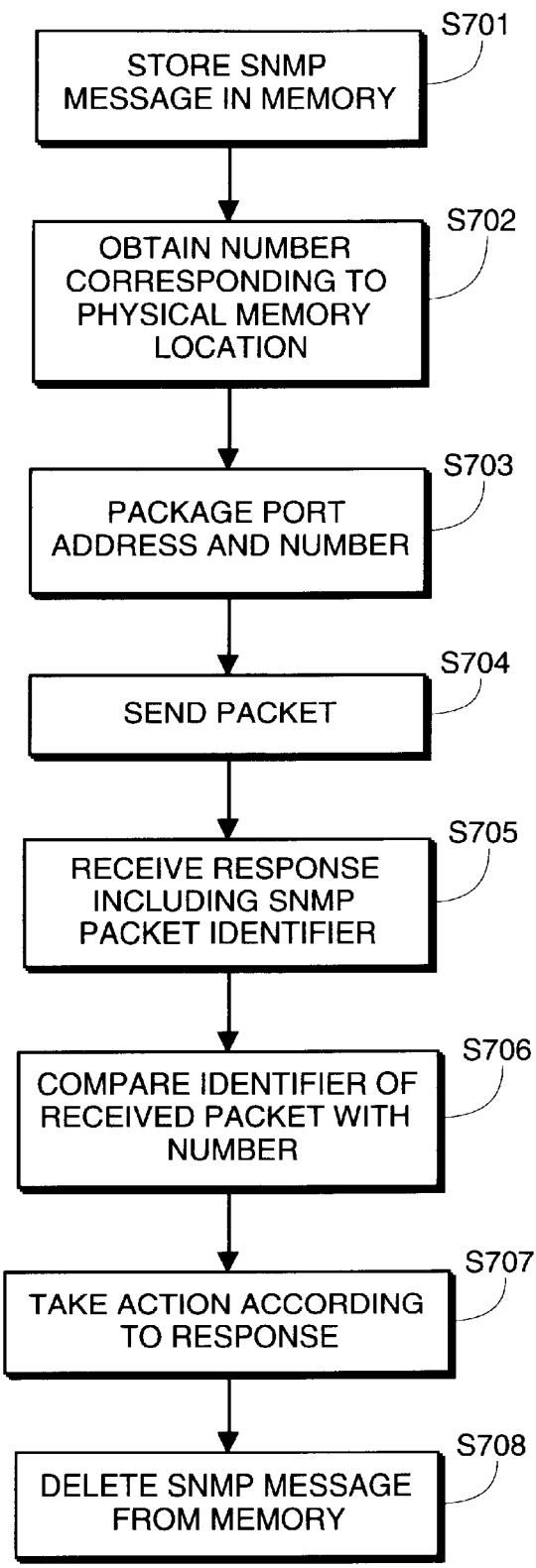
FIG. 7 is a flowchart for explaining communication with a network device by a managing client according to the invention.

FIG. 7 is a flowchart for explaining communication with a network device by a managing client according to the invention. Briefly, a device is managed over a network using a managing client which communicates with the managed device by transmitting SNMP messages over the network. An SNMP message is stored in memory. A number is obtained corresponding to the physical memory address at which the SNMP message is stored in memory. The port address of the managing client is packaged together with the number and the SNMP message into an SNMP network packet, and the SNMP packet is transmitted to the managed device. A response including an SNMP packet identifier is received from the managing device, and the SNMP identifier is compared with the number so as to determine whether the response corresponds to the SNMP message. Action is taken according to the response from the managed device, and then the SNMP message is deleted from memory.

In more detail, in step S701 in FIG. 7, an SNMP message is stored in memory at a particular address in a managing client. In step S702, a number corresponding to the address of the SNMP message is obtained. This number preferably corresponds to the first physical memory address of the SNMP message. However, the number also can correspond to another physical memory address such as the last physical memory address of the SNMP message.

In step S703, the SNMP message is packaged into an SNMP packet. The packet includes a header with a source port address corresponding to the managing client that is sending the message and a destination port address corresponding to a device on network 1. The packet also includes a PID corresponding to the number obtained in step S702. In step S704, the packet is sent, as explained above with reference to FIG. 4.

A response is received from the managed device in step S705. Preferably, the response includes a source port address corresponding to the managed device and a destination port address corresponding to the managing client. Typically, the managed device generates these port addresses by simply swapping the source and destination port addresses in the message sent from the managing client. The response is directed to the appropriate managing client according to the destination port address through operation of protocol stack 78. The response also includes an SNMP packet identifier.

In step S706, the SNMP packet identifier in the response is compared to the number for the address for any outstanding message sent by the managing client. If a match is found, then the SNMP client matches the response to the message, and appropriate action is taken in step S707. Examples of appropriate action include, but are not limited to, sending another message to the device to carry out some management function, displaying the device's status or configuration, or requesting appropriate user input.

In step S708, after action has been taken, the SNMP message is deleted from memory. As a result, the memory can be used for a new message. In addition, because the message is now "safely gone", the PID with a number corresponding to the address of the deleted message can be re-used.

By virtue of the foregoing operation, unique SNMP packet identifiers can be automatically created for outstanding network management messages sent by a managing client. A packet identifier can be reused, but only after a previous message with the same packet identifier has been fully processed. As a result of this operation, problems with conventional PID generation techniques, such out-of-synch counters and packet collisions, are addressed.

The invention has been described with respect to a particular illustrative embodiment. It is to be understood that the invention is not limited to the above described embodiment and that various changes and modifications may be made by those of ordinary skill in the art without departing from the spirit and scope of the invention.

What is claimed is:

1. A method for assigning an identifier to each of network messages, wherein a network message is issued to a device, comprising the steps of:

storing a network message in a memory;

obtaining a number corresponding to a physical memory address of a memory location at which the network message is stored;

transmitting to the device the network message and the obtained number as the identifier of the network message;

receiving from the device a response including an identifier;

comparing the identifier included in the response with the identifier of the transmitted network message so as to determine whether the response corresponds to the transmitted network message; and deleting the network message from the memory.

2. A method according to claim 1, wherein the number corresponds to a first physical memory location of the network message.

3. A method according to claim 1, wherein the number does not correspond to a first physical memory location of the network message.

4. A method according to claim 1, wherein the number corresponds to a last physical memory location of the network message.

5. An apparatus for assigning an identifier to each of network messages, wherein a network message is issued to a device, comprising:

memory including a region for storing executable process steps; and a processor for executing the executable process steps;

wherein the executable process steps include the steps of: storing a network message in a memory, obtaining a number corresponding to a physical memory address of a memory location at which the network message is stored, transmitting to the device the network message and the obtained number as the identifier of the network message, receiving from the device a response including an identifier, comparing the identifier included in the response with the identifier of the transmitted network message so as to determine whether the response corresponds to the transmitted network message, and deleting the network message from the memory.

6. An apparatus according to claim 5, wherein the number corresponds to a first physical memory location of the network message.

7. An apparatus according to claim 5, wherein the number does not correspond to a first physical memory location of the network message.

8. An apparatus according to claim 5, wherein the number corresponds to a last physical memory location of the network message.

9. Computer-executable program code stored on a computer-readable medium, the computer-executable program code to assign an identifier to each of network messages, wherein a network message is issued to a device, the computer-executable program code comprising:

code to store a network message in a memory;

code to obtain a number corresponding to a physical memory address of a memory location at which the network message is stored;

code to transmit to the device the network message and the obtained number as the identifier of the network message;

code to receive from the device a response including an identifier;

code to compare the identifier included in the response with the identifier of the transmitted network message so as to determine whether the response corresponds to the transmitted network message; and code to delete the network message from the memory.

10. Computer-executable program code according to claim 9, wherein the number corresponds to a first physical memory location of the network message.

11. Computer-executable program code according to claim 9, wherein the number does not correspond to a first physical memory location of the network message.

12. Computer-executable program code according to claim 9, wherein the number corresponds to a last physical memory location of the network message.

13. A computer-readable medium which stores computer-executable process steps, the computer-executable process steps to assign an identifier to each of network messages, wherein a network message is issued to a device, the computer-executable process steps comprising:

a storing step to store a network message in a memory;

an obtaining step to obtain a number corresponding to a physical memory address of a memory location at which the network message is stored;

a transmitting step to transmit to the device the network message and the obtained number as the identifier of the network message;

a receiving step to receive from the device a response including an identifier;

a comparing step to compare the identifier included in the response with the identifier of the transmitted network message so as to determine whether the response corresponds to the transmitted network message; and a deleting step to delete the network message from the memory.

14. A computer-readable medium according to claim 13, wherein the number corresponds to a first physical memory location of the network message.

15. A computer-readable medium according to claim 13, wherein the number does not correspond to a first physical memory location of the network message.

16. A computer-readable medium according to claim 13, wherein the number corresponds to a last physical memory location of the network message.

* * * * *

UNITED STATES PATENT AND TRADEMARK OFFICE
CERTIFICATE OF CORRECTION

PATENT NO. : 6,757,280 B1
DATED : June 29, 2004
INVENTOR(S) : Richard Alexander Wilson, Jr.

It is certified that error appears in the above-identified patent and that said Letters Patent is hereby corrected as shown below:

Column 2,
Line 54, "Networks" should read -- Network --.

Column 6,
Line 10, "interface;" should read -- interface --; and
Line 11, "packet-" should read -- packet --.

Signed and Sealed this

Fifth Day of October, 2004

JON W. DUDAS
*Director of the United States Patent and Trademark Office*